Patented Oct. 6, 1936

2,056,185

UNITED STATES PATENT OFFICE 2,056,185

PREPARING AND UTILIZING NATURAL FIBERS

Oscar Casey Greene, Forest Hills, N. Y., assignor to Tropical Products Corporation, New York, N. Y.

No Drawing. Application October 30, 1935,
Serial No. 47,429

17 Claims. (Cl. 92—10)

This invention relates to the preparation, industrial treatment and utilization of organic fibers for obtaining therefrom a purified cellulose high in alpha cellulose content and distinguished by its great tensile strength and other desirable physical characteristics and chemical properties, utilizing as raw material fibers primarily from the Bromeliaceae or Bromelia family of plants, such for instance, as those fiber sources set forth in the work published by Martinus Nijhoff, The Hague, 1911, by H. L. Gerth Van Wijk, entitled "A Dictionary of Plant Names", vol. I, pages 195–196.

It has been found that the natural, relatively abnormal tensile strength of fibers as obtained from the source above indicated, when purified as set forth herein, not only results in obtaining therefrom a purified cellulosic material high in alpha cellulose and other desirable cellulose, but the natural softness and elasticity of the original fiber, for which reason some varieties have been named "silk grass" and "vegetable silk" is substantially conserved, and may be considerably enhanced by the treatment process to which subjected incident to purification, as herein set forth.

I have obtained especially satisfactory results by using fibers of that class of the Bromelia family, sometimes called pineapple fiber, or wild pineapple fiber, and by other names.

In the preparation and treatment of the natural fiber, both for the removal of undesirable impurities and raising the percentage of alpha cellulose or resistant cellulose therein to a commercially obtainable maximum, it has been found unnecessary to operate upon the freshly cut or green fiber, and that any condition or stage of the fiber from the freshly obtained to the fully dried condition, is susceptible to a high degree of purification as represented by alpha cellulose content and freedom from ash, and with the minimum of degradation of the desirable cellulosic portion of the fiber, when treated in accordance with my invention.

Various authors, such as J. Merritt Matthews, in the work "The Textile Fibers", published by John Wiley & Son, New York city, 1907, on pages 323–324, have called attention to the fact that this class of fibers has great natural durability, is substantially unaffected by water, fine in staple, highly lustrous, being white, soft and flexible, and the author refers to Taylor, who subdivided a specimen of the fiber to one tenthousandth (0.0001) of one inch in thickness, and considered by him "the most delicate in structure of any known vegetable fiber. Microscopically it is distinguished from all other leaf fibers by the extreme fineness of its fiber elements". Primarily because the fibers of the Bromelia family as a class are enclosed in a thick median layer of lignified cellulose and lignin-like bodies, often highly resinous in character, it has heretofore been impossible to obtain therefrom the maximum of alpha cellulose fiber, and still conserve the natural, and desirable characteristics, except perhaps in isolated instances incident to laboratory experimentation.

When the fibers are submitted to a sufficiently drastic combined mechanical treatment and chemical separation step, heretofore it has not been possible to effectively remove the ligneous matter, the fat, wax, resin and inorganic portion, and still raise the alpha cellulose content and lower the $\beta$-cellulose, $\gamma$-cellulose and other undesirable cellulosic and other bodies to the minimum, without seriously degrading the alpha cellulose portion, with the result that many of the otherwise desirable physical and chemical characteristics of the purified fiber have been lessened to the point, where relatively commercial inferior products have been produced therefrom, as in the arts embracing the cellulose esters and ethers, artificial filaments, sheets and thermoplastic combinations, and in the paper industry, especially in connection with the production of very fine and thin paper sheets suitable for stencil and mimeographic work, and sometimes referred to as Japan paper and Yoshino paper.

On account of the microscopic fineness of the ultimate fibers of members of the Bromelia family as a class, their relatively high inorganic content, especially siliceous material, the relatively large proportion of fatty, waxy, resinous and other difficultly saponifiable and emulsifiable extraneous material normally contained therein, heretofore described processes have either been so drastic where the objectionable components have been removed substantially in their entirety, that the alpha cellulose portion has also been fundamentally attacked, leaving as a residue a fibrous mass high in $\beta$-cellulose, $\gamma$-cellulose and other undesirable cellulosic bodies, but low in high tensile strength alpha cellulose, the result being that the fibers are deficient in those physical and chemical properties essential for many industries, especially for artificial filaments and film and the preparation of esterified and etherified cellulose derivatives, where the maximum of strength, elasticity, softness, resiliency and elasticity is essential for successful commercial competition.

As the culmination of extended travel in those sections of the natural habitats of fibers of this family, a study of their chemical composition and microscopic structure, laboratory experimentation finally corroborated by pilot plant production, and transformation of the purified fiber so obtained by etherification, esterification both as to inorganic and organic cellulose esters, and production of films, paper and sheets therefrom, with the usual checks as to composition of the various resistant and non-resistant celluloses obtained incident to such treatment steps, a process has been evolved whereby the maximum of alpha cellulose normally present in the fiber is conserved without substantial degradation, the non-resistant and valueless celluloses, non-cellulose bodies, fats, resins, waxes and inorganic components have been substantially eliminated, and a fiber obtained conserving the desirable properties of softness, elasticity and abnormal tensile strength both in the wetted and dried condition, by proceeding as herein set forth.

The following is one example of one method of carrying my purification process into effect to produce from the fibers contained in various plants of the Bromeliaceae, a purified cellulose and cellulosic product high in alpha cellulose content and low in nondesirable celluloses and other matters including lignocellulose bodies, and especially susceptible on account of its desirable physical characteristics for utilization in various arts to which it is applicable, as briefly indicated herein.

I may take 100 parts (all parts herein by weight) based on air-dry weight, either in the green or partially or substantially bone-dry condition, preferably mechanically reduce the fibers to a fine state of sub-division, with or without mechanical removal of detritus therefrom as by a blowing or other mechanical operation, say to within the staple length of fibers of cotton, linen or hemp, or less, as by a mechanical disintegrating step, then place the comminuted fibers in a suitable container connected with a source of heat, as an autoclave or digester with steam coil therein or partially jacketed, and boil the fibers with water for about one-half hour at a temperature around 110° (all temperatures herein centigrade). This preliminary boil-off is not necessary but has been found advisable in that less chemicals are required in the subsequent purification process, and the latter step is usually lessened by virtue of this preliminary boil-off operation.

By means of an opening at the bottom of the autoclave the discolored water may be run off, and the charge washed with water until the exit water is substantiallly colorless. About 100 gallons of water is then added to the fiber in the autoclave, and the following materials added:—

|  | Pounds |
|---|---|
| An alkali silicate | 6 |
| An alkali metal carbonate | 4 |
| An alkali metal hydroxide | 3 |
| An alkali metal hexametaphosphate | 2.5 |
| A potash oil soap | 3 |

No unsaponifiable oil as paraffin oil, or heavy metal salt as zinc sulphate is employed.

For an alkali silicate, I prefer a grade of commercial water glass, which appears to combine with the silica residue present in the original fiber and substantially remove the same, the silicate normally present, according to my investigations being organically combined, at least to a high degree. The presence of the silicate appears also to induce a certain degree of porosity to the fibers of the Bromelia family, whereby the other components may act more readily and efficiently.

For an alkali metal carbonate, I prefer to use sodium carbonate on account of its relative cheapness over the other available carbonates commercially. The carbonate in conjunction with an alkali metal hydroxide as sodium hydroxide or potassium hydroxide or a mixture of both, facilitates both emulsion and saponification of the emulsifiable and saponifiable bodies naturally present in the fibers, forming a soap solution or soapy suspension which materially facilitates purification of the fiber, and the solution or colloidation of the undesirable celluloses present normally in the fiber.

The sodium hexametaphosphate or other water-soluble salt of hexametaphosphoric acid, especially in conjunction with an alkaline body as an alkali metal hydroxide or carbonate or both, appears to permit of the softening gelatinization, colloiding, emulsification and saponification of the intercellular cementitious substance, without observably affecting the alpha cellulose component, and with a removal of the $\beta$-cellulose and $\gamma$-cellulosic portions, when used in conjunction as above indicated, and in the presence of a soap.

As a potash oil soap, I prefer a potassium salt of vegetable oil acids, as of olive oil, castor oil, cottonseed oil or the like, having obtained better results in operating upon this class of fibers than when a saponified animal oil or animal fatty acid is employed.

Depending upon the nature and source of the fiber, the silica content of the same and the question of organically or inorganically bound silicon, the percentage and nature of the lignocellulose and non-alpha cellulosic bodies present, the amount and nature of the beta-, gamma, and non-resistant celluloses present, and the use to which the purified cellulose is intended to be put in the arts, the above named components may be substituted by substantial equivalents, may be varied as to quantity and relation one to the other, in order to obtain the maximum of alpha cellulose in the final product with the minimum of inorganic components left behind and the minimum of non-resistant celluloses and non-cellulosic bodies present, while still conserving to the maximum its otherwise desirable properties for the specific purposes to which it is intended to be used, as will be readily understood by those skilled in the art to which this invention appertains.

Upon introduction of chemicals into digester in which the fiber is present, heat is applied, and continued preferably at a temperature of about 125°, for a period between one and two hours, or until a sample withdrawn and submitted to test, indicates the degree of purification desired has been attained, when the heat is turned off, contents allowed to cool to below 100°, the liquor removed, and the contents washed with water until the exit water appears substantially colorless.

The fibers may then be placed in a beater and treated in a manner similar to that when paper or sheets are required in the arts, the sheets being varied in thickness from the relatively thin sheets used in stencil sheet production, to sheets intended for viscose rayon production of about forty points thickness (forty-thousandths of an inch) or thicker.

Or the fibers in the wet purified condition may be whitened by a treatment with peroxide or some form of chlorine or other bleach, hydro-extracted and then dried with artificial heat, preferably at a low temperature, where the cellulose is to be used in other than sheet form.

If the beating process does not break up all the fibrous bundles into their individual fibrillae, then the product from the beater may be jordaned, screened or otherwise treated to remove a very small proportion of shives, or fibers which have not reached the physical ultimate in disintegration.

The beating, and/or subsequent steps required to place the alpha cellulose in proper condition for the particular use to which intended, may be conducted in a relatively short period, usually within an hour, and the bleaching operation usually requires but a fraction of bleach to that normally required of natural fibers as cotton, hemp or flax.

A representative purified fiber of the Bromelia family, as a pineapple fiber, obtained by proceeding as above set forth would have the composition, as a mean of a number of analyses:—

| | Per cent |
|---|---|
| Alpha cellulose (dry basis) | 90– 96 |
| β- and γ-cellulose | 2– 5 |
| Ash | 0.2–0.9 |
| Ether extractable | 0.3–1.0 |

The original softness of this general class of fibers, their relatively high luster and elasticity, together with high alpha cellulose content and other desirable properties, makes the alpha cellulose as obtained by purification of cellulosic material by my invention from fibers of the Bromeliaceae, especially advantageous for the fabrication of rayons as by the viscose, copper-ammonia and nitrocellulose processes, the production of artificial filaments and sheets as by the acetylated cellulose process, the etherification of cellulose in the preparation of alkyl-, aryl and aralkyl-celluloses, and the production of cellulose ether and cellulose ester thermoplastic combinations and celluloids, and for the production of cellulose in sheet form, irrespective of the thickness of the sheet or the purpose to which the sheet is to be applied.

The high absorptive capacity of sheets made by my process, together with their receptiveness for mordanting, loading, impregnating and added materials thereto to impart specific properties, enables them to be used competitively with other fibers, either alone or in admixture. The high tensile strength of the purified fibers, and their capacity to withstand acids of relatively high degree of concentration, makes them especially suitable for the filtration of acids of medium concentration, either as the fiber per se, or when admixed with asbestos as in a beating process, and then sheeted, or for the filtration of solutions of low acid content, neutral, or of alkaline reaction.

What I claim is:—

1. A process for the treatment of fibers comprising heating said fibers with a solution containing a hexametaphosphate continuing treatment until the degree of purification desired has been reached then removing the water and products of reaction.

2. A process for the treatment of fibers of the Bromeliaceae comprising heating said fibers at about 125° C. with a solution containing an alkaline hexametaphosphate continuing treatment until the washed and dried product contains a maximum of alpha cellulose then removing the water and products of reaction.

3. A process for the treatment of fibers of the Bromelia family comprising heating said fibers at about 125° C. for several hours with a solution containing a sodium hexametaphosphate continuing treatment until the washed and dried product contains a minimum of 90% alpha cellulose and less than 1% ash then removing the water and products of reaction.

4. A process for the treatment of pineapple fiber comprising heating said fibers with a solution containing a hexametaphosphate in conjunction with an alkali mixture and in the presence of a saponified oil continuing treatment until the degree of purification desired has been reached then removing the water and products of reaction.

5. A process for the treatment of fibers of the Bromeliaceae comprising heating said fibers at about 125° C. with a solution containing an alkaline hexametaphosphate in conjunction with an alkali mixture containing an alkali carbonate and in the presence of a saponified vegetable oil continuing treatment until the washed and dried product contains a maximum of alpha cellulose then removing the water and products of reaction.

6. A process for the treatment of fibers of the Bromelia family comprising heating said fibers at about 125° C. for several hours with a solution containing a sodium hexametaphosphate in conjunction with an alkali mixture containing an alkali hydroxide and in the presence of a potash saponified vegetable oil continuing treatment until the washed and dried product contains a minimum of 90% alpha cellulose and less than 1% ash then removing the water and products of reaction.

7. A process for the treatment of fibers comprising heating said fibers with a solution containing a hexametaphosphate in conjunction with an alkali mixture containing an alkali hydroxide and carbonate and in the presence of a saponified oil continuing treatment until the degree of purification desired has been reached then removing the water and products of reaction.

8. A process for the treatment of fibers of the Bromeliaceae comprising heating said fibers at about 125° C. with a solution containing an alkaline hexametaphosphate in conjunction with an alkali mixture and in the presence of a saponified vegetable oil continuing treatment until the washed and dried product contains a maximum of alpha cellulose then removing the water and products of reaction.

9. A process for the treatment of fibers of the Bromelia family comprising heating said fibers at about 125° C. for several hours with a solution containing a sodium hexametaphosphate in conjunction with an alkali mixture containing an alkali carbonate and in the presence of a potash saponified vegetable oil continuing treatment until the washed and dried product contains a minimum of 90% alpha cellulose and less than 1% ash then removing the water and products of reaction.

10. A process for the treatment of pineapple fiber comprising heating said fibers with a solution containing a hexametaphosphate in conjunction with an alkali mixture containing an alkali hydroxide and in the presence of a saponified oil continuing treatment until the degree 11. A process for the treatment of fibers of the Bromeliaceae comprising heating said fibers at about 125° C. with a solution containing an alkaline hexametaphosphate in conjunction with an alkali mixture containing an alkali hydroxide and carbonate and in the presence of a saponified vegetable oil continuing treatment until the washed and dried product contains a maximum of alpha cellulose then removing the water and products of reaction.

12. A process for the treatment of fibers of the Bromelia family comprising heating said fibers at about 125° C. for several hours with a solution containing a sodium hexametaphosphate in conjunction with an alkali mixture and in the presence of a potash saponified vegetable oil continuing treatment until the washed and dried product contains a minimum of 90% alpha cellulose and less than 1% ash then removing the water and products of reaction.

13. A process for the treatment of fibers comprising heating said fibers with a solution containing a hexametaphosphate in conjunction with an alkali mixture containing an alkali carbonate and in the presence of a saponified oil continuing treatment until the degree of purification desired has been reached then removing the water and products of reaction.

14. A process for the treatment of fibers of the Bromeliaceae comprising heating said fibers at about 125° C. with a solution containing an alkaline hexametaphosphate in conjunction with an alkali mixture containing an alkali hydroxide and in the presence of a saponified vegetable oil continuing treatment until the washed and dried product contains a maximum of alpha cellulose then removing the water and products of reaction.

15. A process for the treatment of fibers of the Bromelia family comprising heating said fibers at about 125° C. for several hours with a solution containing a sodium hexametaphosphate in conjunction with an alkali mixture containing an alkali hydroxide and carbonate and in the presence of a potash saponified vegetable oil continuing treatment until the washed and dried product contains a minimum of 90% alpha cellulose and less than 1% ash then removing the water and products of reaction.

16. A process for the treatment of 100 parts by weight of fibers of the Bromelia family comprising heating said fibers in a digester at about 125° C. for one to two hours with a solution containing 800 parts water, 4 parts alkali silicate, 4 parts alkali carbonate, 3 parts alkali metal hydroxide, 2.5 parts alkali metal hexametaphosphate, and 3 parts potash oil soap, washing products of reaction therefrom, then placing said fibers by ways now known in the physical condition desired, and removing water therefrom.

17. A process for the production of alpha cellulose, comprising heating about 100 parts of pineapple fiber in a digester at about 125° for one to two hours with a solution comprising about 800 parts water, 4 parts commercial silicate of soda, 4 parts sodium carbonate, 3 parts potash soap of vegetable oil, discontinuing heat, washing out products of reaction until wash water runs thru clear, mechanically opening out fiber bundles as by a heating process, removing shives as by a screening operation, then removing water therefrom.

OSCAR CASEY GREENE.